United States Patent
Cohen et al.

(10) Patent No.: US 10,339,175 B2
(45) Date of Patent: Jul. 2, 2019

(54) AGGREGATING PHOTOS CAPTURED AT AN EVENT

(71) Applicant: Google LLC, Mountain View, CA (US)

(72) Inventors: Dave Cohen, Mountain View, CA (US); Matthew Steiner, Mountain View, CA (US); Thomas Kang, Santa Monica, CA (US); Chandrashekar Raghavan, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/339,536

(22) Filed: Oct. 31, 2016

(65) Prior Publication Data

US 2017/0046341 A1      Feb. 16, 2017

Related U.S. Application Data

(63) Continuation of application No. 13/480,997, filed on May 25, 2012, now Pat. No. 9,483,556.

(51) Int. Cl.

| | |
|---|---|
| *G06F 13/00* | (2006.01) |
| *G06F 16/51* | (2019.01) |
| *G06K 9/00* | (2006.01) |
| *G06F 16/783* | (2019.01) |
| *H04B 5/00* | (2006.01) |
| *H04L 29/08* | (2006.01) |

(Continued)

(52) U.S. Cl.
CPC .......... *G06F 16/51* (2019.01); *G06F 16/7837* (2019.01); *G06K 9/00677* (2013.01);
(Continued)

(58) Field of Classification Search
CPC ............. G06F 17/3079; G06F 17/3028; G06F 17/30864; G06F 16/51; G06F 16/7837; G06F 16/951; H04N 21/44008; H04N 1/00; H04N 1/00307; H04N 1/00342; H04N 1/2187; H04N 1/32128; H04N 2201/006; H04N 2201/3247; H04N 2201/3278; H04N 2201/3249; G06K 9/00711; G06K 9/00677; G06K 9/0067; H04L 67/146; H04B 5/0031
(Continued)

(56) References Cited

U.S. PATENT DOCUMENTS

| | | | |
|---|---|---|---|
| 8,442,265 B1 * | 5/2013 | Bosworth | .......... G06K 9/00677 |
| | | | 382/100 |
| 8,825,783 B1 | 9/2014 | Nace | |

(Continued)

FOREIGN PATENT DOCUMENTS

WO     2011101849     8/2011

*Primary Examiner* — Kenneth R Coulter
(74) *Attorney, Agent, or Firm* — IP Spring

(57) ABSTRACT

Methods and systems for aggregating digital content captured at an event. In one aspect, a connection is established from a computing device to a Near Field Communication (NFC) enabled event check-in point located at the event. The NFC enabled event check-in point is encoded with event identification information for the event. The event identification information includes an event Uniform Resource Locator (URL) for a webpage associated with a computing system. The computing device receives event identification information including the event URL from the NFC enabled event check-in point, and transmits digital images captured at the event to a computing system.

20 Claims, 6 Drawing Sheets

(51) Int. Cl.
*H04N 1/00* (2006.01)
*H04N 1/21* (2006.01)
*H04N 1/32* (2006.01)
*G06F 16/951* (2019.01)

(52) U.S. Cl.
CPC ......... *H04B 5/0031* (2013.01); *H04L 67/146* (2013.01); *H04N 1/00307* (2013.01); *H04N 1/00342* (2013.01); *H04N 1/2187* (2013.01); *H04N 1/32128* (2013.01); *G06F 16/951* (2019.01); *H04N 2201/006* (2013.01); *H04N 2201/3247* (2013.01); *H04N 2201/3249* (2013.01); *H04N 2201/3278* (2013.01)

(58) Field of Classification Search
USPC ......... 709/204–206, 245; 715/751–759, 733; 382/100, 103
See application file for complete search history.

(56) References Cited

U.S. PATENT DOCUMENTS

| | | | | |
|---|---|---|---|---|
| 9,070,149 | B2* | 6/2015 | Lin | G06F 21/10 |
| 9,286,641 | B2* | 3/2016 | Bosworth | G06Q 10/10 |
| 9,483,556 | B1* | 11/2016 | Cohen | G06F 17/3079 |
| 9,762,956 | B2* | 9/2017 | Bosworth | G06K 9/00677 |
| 2008/0298766 | A1 | 12/2008 | Wen et al. | |
| 2009/0252383 | A1 | 10/2009 | Adam et al. | |
| 2010/0082448 | A1* | 4/2010 | Lin | G06F 21/10 705/26.1 |
| 2011/0085710 | A1 | 4/2011 | Perlmutter et al. | |
| 2011/0099199 | A1 | 4/2011 | Stalenhoef et al. | |
| 2013/0101219 | A1* | 4/2013 | Bosworth | G06F 17/3079 382/195 |
| 2013/0104080 | A1 | 4/2013 | Bosworth et al. | |
| 2013/0227603 | A1 | 8/2013 | Bosworth et al. | |

\* cited by examiner

AGGREGATING PHOTOS CAPTURED AT AN EVENT

RELATED APPLICATIONS

This application is a continuation of, and claims priority to, U.S. patent application Ser. No. 13/480,997, filed May 25, 2012, the contents of which are incorporated herein by reference in their entirety.

BACKGROUND

The present disclosure relates generally to online management and sharing of digital images captured using portable digital image capturing devices such as digital cameras and mobile smart phones. Various online websites, including online social networking sites, enable users to manage and share digital images, as well as view digital images uploaded by other users.

SUMMARY

One approach to aggregating content captured at an event is a system. The system comprises at least one computing device operably coupled to at least one memory. The computing device is configured to establish a connection to a Near Field Communication (NFC) enabled event check-in point located at the event. The NFC enabled event check-in point is encoded with event identification information for the event. The event identification information includes an event Uniform Resource Locator (URL) for a webpage associated with a computing system. The computing device is further configured to receive event identification information including the event URL from the NFC enabled event check-in point. The computing device is further configured to receive a digital image captured at the event. The computing device is further configured to transmit, over a network, the captured digital image to the computing system. The computing device is further configured to receive, over the network, from the computing system, an aggregation of digital images taken at the event by at least a plurality of NFC enabled photo taking devices.

Another approach to aggregating content captured at an event is a system. The system comprises at least one computing device operably coupled to at least one memory. The computing device is configured to establish a connection to an NFC enabled event check-in point located at the event. The computing device is further configured to receive event identification information from the NFC enabled event check-in point. The computing device is further configured to receive a digital image captured at the event. The computing device is further configured to transmit, over a network, the captured digital image to a computing system identified by at least one identifier in the event identification information.

Another approach to aggregating content captured at an event is a method. The method includes receiving, over a network, at least one digital image from each of a plurality of NFC enabled computing devices. The digital images are associated with the same event identifying information. The method further includes aggregating the received digital images into at least one online digital image album. The method further includes transmitting, over the network, the aggregated digital images to at least one of the NFC enabled computing devices.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Users of online social networking sites, online photo management sites, and other online systems upload and manage digital images as well as view digital images uploaded by other users. One or more embodiments are directed to enabling users attending an event to upload photos, videos, audio clips, animated Graphics Interchange Format ("GIF") files, and other digital media to an online system using information received from an NFC enabled event check-in point. In these embodiments, while at the event, users can capture digital images using a user device 106 such as a digital camera or a mobile phone. One or more NFC enabled event check-in points may be located at the event.

A person attending the event and using an online system such as an online social network system 110 or an online photo sharing system 112 can tap their user device 106 against an NFC enabled event check-in point. In some embodiments, other communication networks can be used for communication between the check-in point 114 and the user device 106 including Bluetooth network, WiFi network, etc. Once connection is established between the user device 106 and the NFC enabled event check-in point 114, event identification information is transmitted from the NFC enabled event check-in point 114 to the user device 106. The event identification information can include information identifying a webpage or a system or an on-line collection to which the user device can transmit images captured at the event. For example, the event identification information can include a Uniform Resource Locator ("URL") for a webpage associated with the online system. Using the received event identification information, the user device 106 can transmit captured digital images. In turn, the online system can aggregate the digital images taken at the event by one or more users into one or more photo albums.

Although the various examples provided in the present disclosure are directed towards online systems (e.g., an online social networking website) capable of photo management, as well as online search engines that return images related to search requests, the disclosed methods can be used by any other types of systems in order to facilitate communication between a website and one or more user devices.

Figure 1:
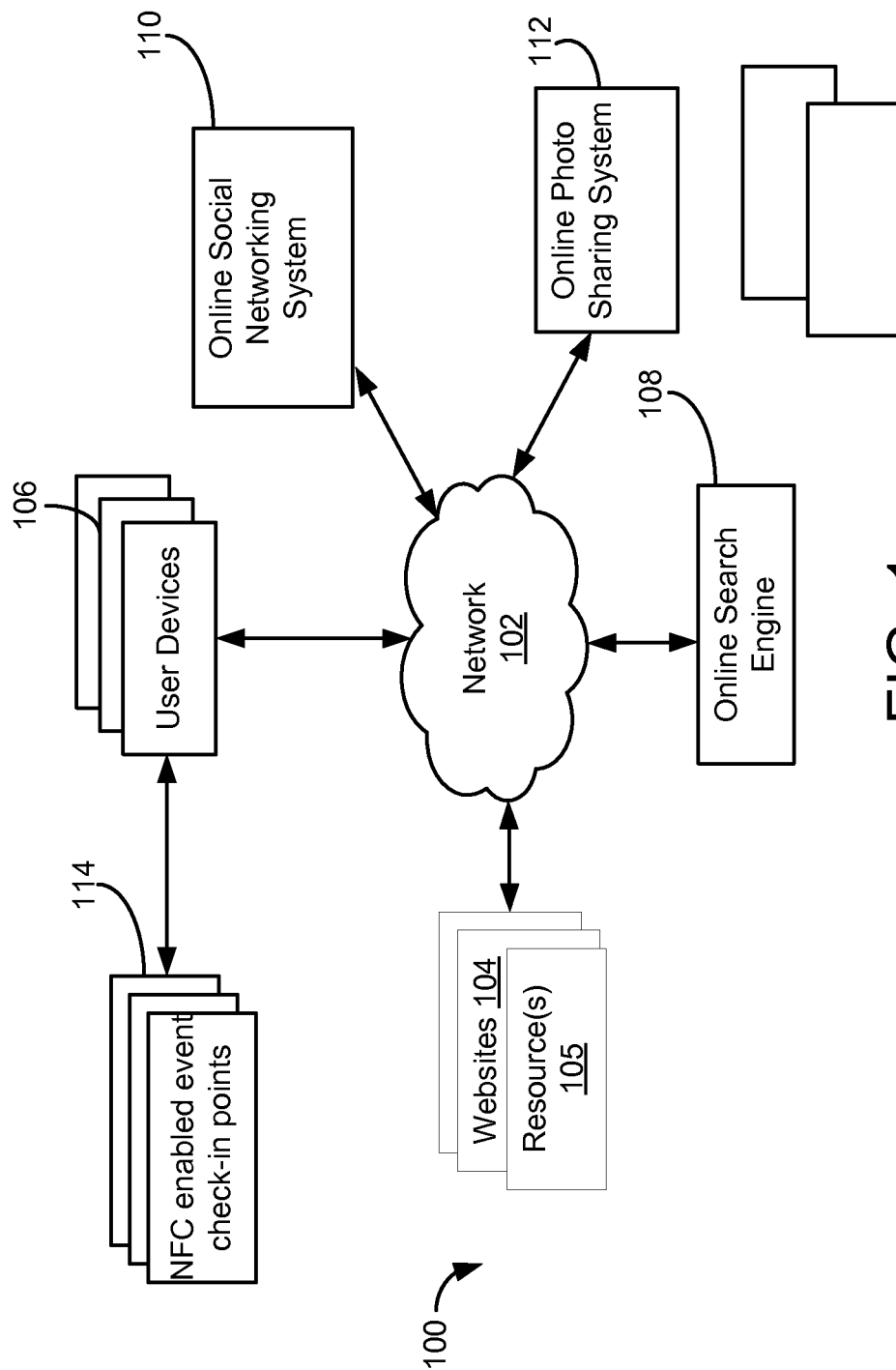
FIG. 1 illustrates a block diagram of an example environment in which user devices utilize photo sharing and management services and search engine services of online systems in accordance with an illustrative embodiment.

FIG. 1 is a block diagram of an example environment 100 in which user devices 106 utilize photo management services and search engine services of online systems. The example environment 100 includes a network 102, such as a local area network (LAN), a wide area network (WAN), a wireless network, the Internet, a cellular network, a radio network, a satellite network, or a combination thereof. The network 102 connects websites 104, user devices 106, an online search engine 108, the online social networking system 110, and the online photo sharing system 112. The environment 100 may include any number of websites 104, user devices 106, and various online systems providing online services to the user devices 106.

The environment 100 includes NFC enabled event check-in points 114. The NFC enabled event check-in points 114 can include NFC chips and/or NFC devices. User devices 106 can communicate with the NFC enabled event check-in points 114 using an NFC communication protocol. A connection can be established between an NFC enabled event check-in point 114 and a user device 106 when the user device 106 is brought into close proximity (e.g., within a few centimeters) of the NFC enabled event check-in point 114 and/or when the user device 106 and the NFC enabled event check-in point 114 are touched together. For example, the NFC enabled event check-in point 114 may be located at a venue of an event attended by a user of the user device 106. In this example, the user can tap their user device 106 against the NFC enabled event check-in point 114. The NFC enabled check-in point 114 may be an unpowered chip or tag, or it may be independently powered by a battery. The NFC enabled check-in point 114 and user device 106 may operate according to any of a number of standards covering communication protocols and data exchange formats, such as ISO/IEC 14443, FeliCa, ISO/IEC 18092 and others defined by the NFC Forum. In alternative embodiments, other wireless technologies may be used, such as other radio frequency ID technologies or a Bluetooth standard communication protocol.

Once connection is established between the NFC enabled event check-in point 114 and the user device 106, various data may be exchanged. For example, the NFC enabled event check-in point 114 may transmit event identification information to the user device 106. The event identification information may identify a webpage to which the user device 106 can transmit data related to the event such as digital images captured at the event.

User devices belonging to others present at the event may also establish a connection to the same or different NFC enabled event check-in point and receive event identification information. As a result, multiple user devices 106 may receive the same event identification information, and upload images to a system identified by this event identification information. The online system (e.g., the online social networking system 110) can in turn aggregate the digital images taken by multiple users at the event into a single or multiple photo albums that are available for viewing to various users.

Each website 104 includes one or more resources 105 associated with a domain name and hosted by one or more servers. An example website is a collection of web pages formatted in hypertext markup language (HTML) that can contain text, images, multimedia content, and programming elements, such as scripts.

The resource 105 is any data that can be provided over the network 102. The resource 105 is identified by a resource address that is associated with the resource 105, such as a URL. Resources 105 can include web pages, word processing documents, portable document format (PDF) documents, images, video, programming elements, interactive content, and feed sources, to name only a few. Resources 105 can include content, such as words, phrases, images and sounds, that may include embedded information (such as meta-information in hyperlinks) and/or embedded instructions. Embedded instructions can include code that is executed at a user's device, such as in a web browser. Code can be written in languages, such as, JavaScript® or ECMAScript®.

A user device 106 is an electronic device that is under the control of a user. The user device 106 is configured to request and receive resources 105 over the network 102. Example user devices 106 include personal computers, mobile communication devices (e.g., cellular telephone, smart phone, etc.), digital cameras, and other computing devices (e.g., having a processor and memory or other type of computer-readable medium) that can send and receive data over the network 102. In some embodiments, the user devices 106 may include a user application, such as a web browser, to facilitate the sending and receiving of data over the network 102. In other embodiments, the user devices 106 may include an application (e.g., phone application) for communication with online systems (e.g., systems 110 and 112).

The user devices 106 can request resources 105 from a website 104. In turn, data representing the resource 105 can be provided to the user device 106 for presentation by the user device 106 (e.g., on an electronic display, as an audible sound via a speaker, or a combination thereof).

The online social networking system 110 can include a website 104 enabling users to communicate with one another by sending messages, sharing photos, etc. The system 110 may be configured to store relationships between users, such as "friends," "family," "work friends," etc., and to limit the sharing of messages, photos and other content based on these pre-stored relationships. Using the system 110, users can create and share albums of photos with some or all of their friends. For example, users can select people to share particular content with (e.g., select certain friends to share photos with).

The online photos sharing system 112 can also include a website 104 that allows users to share photos. Using the resources 105 associated with the website 104 of the online social networking system 110 or the online photo sharing system 112, users can upload, view, delete, edit, send to printer, "auto-fix," download, and otherwise manage photos. Users can tag images with tags describing the contents of the images. For example, a tag can include a name of a person displayed in the image and can further comprise a hyperlink to the person's profile page or profile data.

Figure 2:
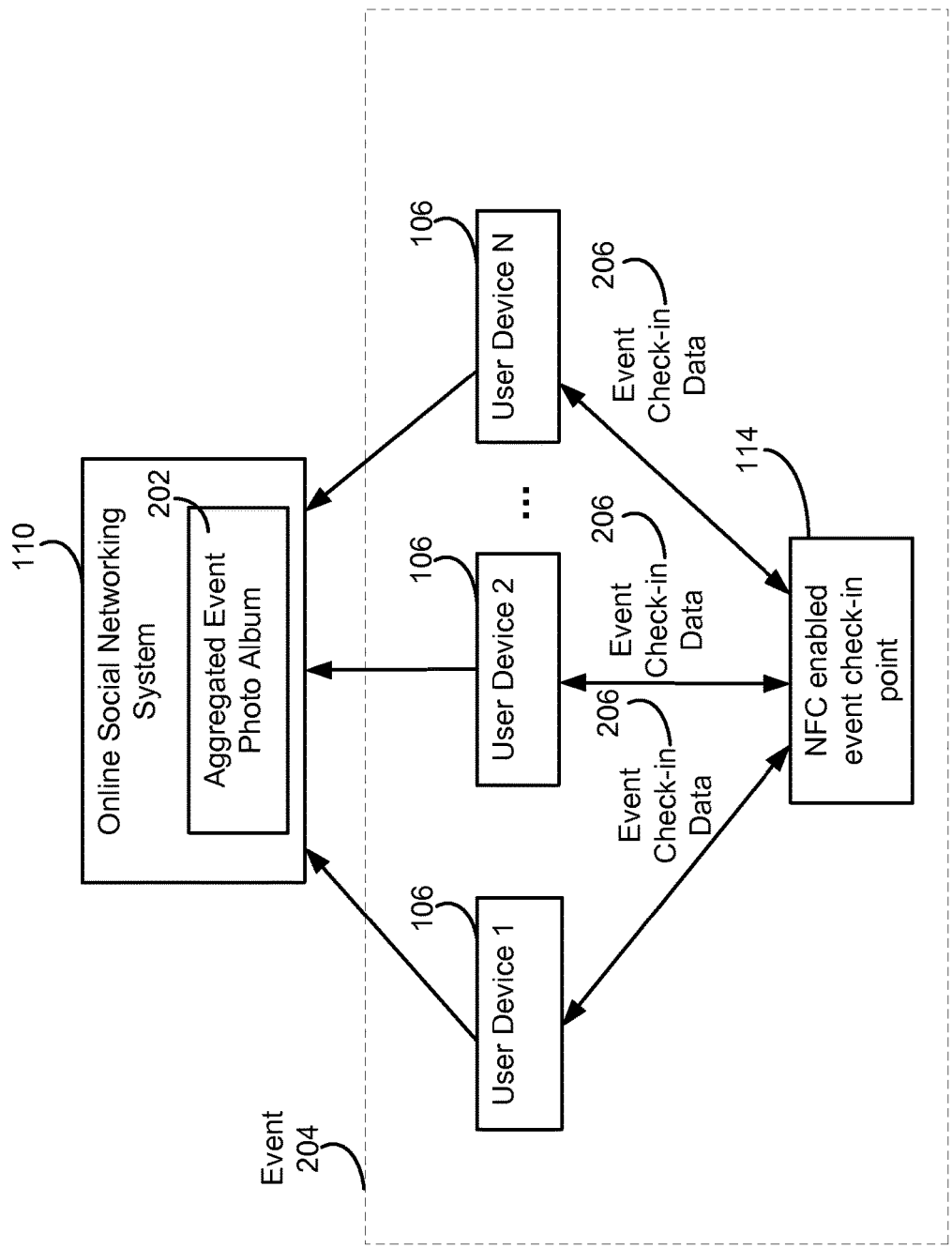
FIG. 2 illustrates a block diagram illustrating user devices utilizing a near field communication (NFC) enabled event check-in point to aggregate photos taken at an event in accordance with an illustrative embodiment.

As shown in FIG. 2, user devices 1 through N 106 and the NFC enabled event check-in point 114 are located at an event 204. In other embodiments, more than one NFC enabled event check-in point may be located at the event 204. In these embodiments, various user devices at the event can tap one of the available NFC enabled event check-in points. For example, each table at a wedding may have an NFC enabled event check-in point, and the user devices 106 belonging to people sitting at the table can establish a connection to the NFC enabled event check-in point located at their table. In this example, each NFC enabled event check-in point present at the event may be encoded with event information and other information that may be available to the user devices 106, such as table number or table ID, "friend of bride" or "friend of groom," etc. In turn, the user devices 106 can use the event information received or retrieved from the NFC enabled event check-in points to share, sort, and/or annotate in metadata digital images taken at the event.

The event 204 can include any type of gathering such as a ceremony, convention, festival (e.g., musical event), media event, sporting event, business or corporate function, a party (e.g., a birthday party, a baby shower party), etc. At least some of the attendants of the event can be users of the online social networking system 110. These users may utilize user devices 106 such as smart phones to capture digital images at the event 204 and upload them to the online social networking system 110 for sharing with other users in their social network.

The NFC enabled event check-in point 114 provides event check-in data 206 to the user devices 106 to facilitate transmission of digital images and other content to the online social networking system 110. In some embodiments, the event check-in data 206 includes identifying information related to the online social networking system 110. For example, the event check-in data 206 may include a URL of a webpage associated with the online social networking system 110. The webpage may be associated with the event 204, and access may be provided to all the user devices 106 present at the event 204 that established a connection to the NFC enabled event check-in point 114.

The online social networking system 110 may include an aggregated event photo album 202 created for the event 204. The user devices 106 present at the event 204 can transmit or upload digital images, as well as other digital media (e.g., videos, audio clips, animated GIFs) to the aggregated event photo album 202 using the event check-in data 206 received from the NFC enabled event check-in point 114. In some embodiments, there may be more than one photo album associated with the event 204. For example, if some of the users of user devices 106 are not in each other's social network in the context of the online social network system 110, there may be multiple event photo albums associated with the event 204. Accordingly, although one aggregate event photo album 202 is illustrated in FIG. 2, any number of aggregated event photo albums may be associated with the event 204 and managed using the online social networking system 110.

Figure 3:
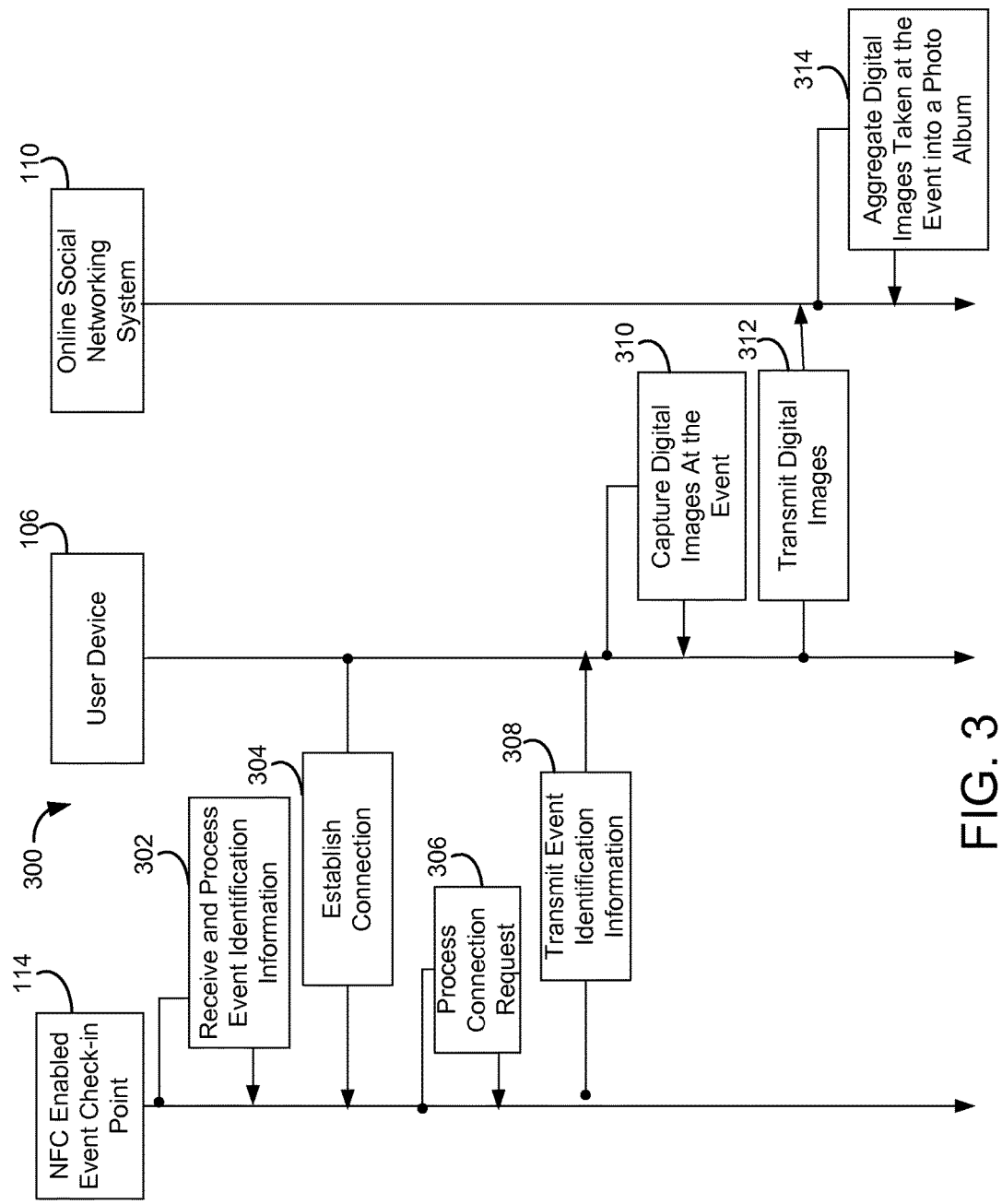
FIG. 3 is a flow diagram of an example process for aggregating digital images taken at an event into a photo album using an NFC enabled event check-in point in accordance with an illustrative embodiment.

FIG. 3 is a flow diagram of a process 300 for aggregating digital images taken at an event (e.g., the event 204) into a photo album (e.g., the aggregated event photo album 202) using an NFC enabled event check-in point 114, in accordance with an illustrative embodiment. The process 300 can be implemented on a computing device such as a user device 106. In one embodiment, the process 300 is encoded on a computer-readable medium that contains instructions that, when executed by a computing device, cause the computing device to perform operations of the process 300.

At block 302, the NFC enabled check-in point 114 receives and processes data including event identification information and/or other types of information (e.g., information identifying the NFC enabled check-in point 114). The step in block 302 can be performed once during initial configuration of the NFC enabled check-in point 114. In some embodiments, various data is received by the NFC enabled event check-in point 114 during manufacture of the NFC enabled event check-in point 114. The manufactured NFC enabled event check-in point 114 is shipped from a manufacturing facility with encoded event identification information and/or other information. In other embodiments, data is received by the NFC enabled event check-in point 114 via a universal serial bus ("USB") and client-side software installed on the NFC enabled event check-in point 114. In these embodiments, the NFC enabled event check-in point 114 is connected to a client device via USB and receives data of interest from the client device. In other embodiments, the data is stored on a memory card that can be installed on the NFC enabled event check-in point 114. In other embodiments, the NFC enabled event check-in point 114 receives the information when it is tapped to a client device having data (e.g., received from a server). As a result, the NFC enabled check-in point 114 is programmed with data including event identification information. The NFC enabled check-in point 114 can be updated with new data including new event identification data using any of the data communication methods discussed in this paragraph.

The process 300 includes establishing (block 304) a connection to the NFC enabled event check-in point 114. The connection can be established when the user device 106 comes into physical contact or close proximity with the NFC enabled event check-in point 114. For example, if the user device 106 is tapped against the NFC enabled event check-in point 114, a connection may be established using a communication protocol (e.g., ISO/IEC 14443, FeliCa, etc.). In some embodiments, other communication networks can be used for communication between the check-in point 114 and the user devices 106 including Bluetooth network, WiFi network, etc. Users at the event can take a photo of a barcode that corresponds to the event, check-in on their mobile user devices, and then capture content during the event. In some embodiments, non-networked cameras (e.g., digital single-lens reflect cameras) capture images at an event that need to be associated with the event. In these embodiments, the GPS coordinates and time can be utilized to associate content captured by the user device 106 with the event. Non-networked user devices can contribute photos to an event by taking a photo of a barcode that corresponds to the event.

At block 306, the connection request from the user device 106 is processed by the NFC enabled event check-in point 114. The connection request may include information identifying the user device 106 and/or the user using the user device 106. For example, the connection request may include the user's account information associated with the online social networking system 110 such as user login name or another user identifier or credentials.

In some embodiments, the NFC enabled event check-in point 114 may store or have access to a listing of users or user devices that can receive the event check-in data 206. If the user device establishing a connection matches one of the items on the listing of users or user devices, then the event check-in data 206 is transmitted (block 308) to the user device 106. In other embodiments, the NFC enabled event check-in point 114 may transmit (block 308) the event check-in data 206 or other data to any user device that establishes a connection with it.

Digital images are captured (block 310) at the event by the user device 106. The user device 106 may allow the user to edit, view, and delete captured digital images. Using the event check-in data, the user device 106 can transmit (block 312) the captured digital images to the online social networking system 110. The event check-in data 206 can indicate destination information such as a URL of a webpage associated with the online social networking system 110. The check-in data associates the user with the event such that any of the relevant content can be added from the user to the event.

In some embodiments, the user can select digital images for transmission to the online social networking system 110. For example, the user could select twenty out of fifty digital images captured at an event to be uploaded to the online social networking system 110. The user may upload different digital images during the duration of the event or upload the digital images once during the event or after the event is over. In other embodiments, the digital images captured by the user may be automatically transmitted on an intermittent basis during the event or after the event without requiring an explicit user interaction to send the images. In these embodiments, a client software application installed on the user device 106 may automatically transmit the captured images to the online social networking system 110 using the event check-in data 206 received from the NFC enabled event check-in point 114.

At block 314, the online social networking system 110 aggregates the digital images captured by multiple users at the event. There may be a single or multiple photo albums created for the event. The one or more photo albums may be updated as digital images are uploaded by various users. The photo album(s) can be available to the users for viewing, editing, commenting, and/or deleting via one or more user interfaces provided by the online social networking system 110. For example, users may be able to view digital images of the event using a web browser or a client software application available on their user device 106. Accordingly, a user can view digital images captured by other users present at the event and who are in the user's social network. Although the online social networking system 110 is displayed in FIG. 3, any other type of computing system can manage digital images received from user devices 106.

Figure 4:
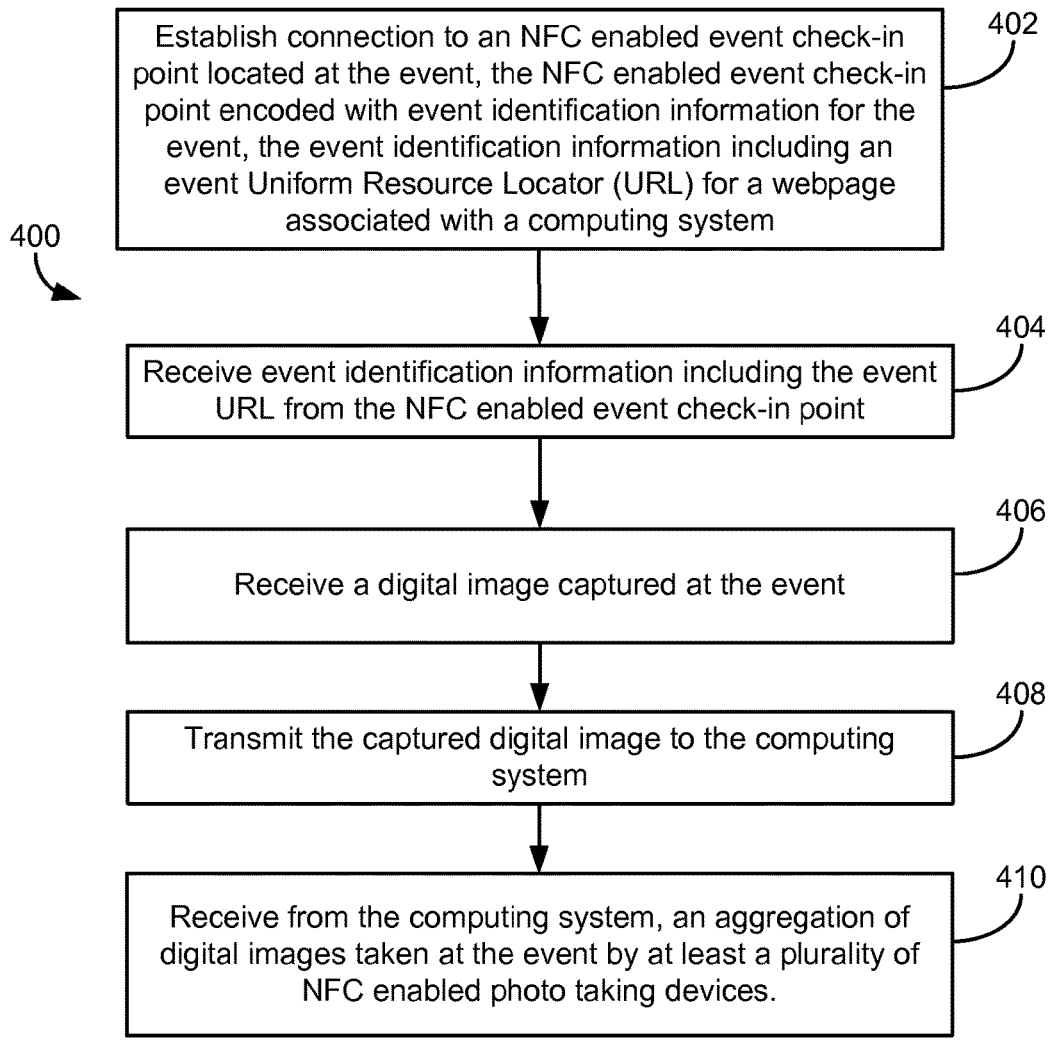
FIG. 4 is a flow diagram of an example process for transmitting images to a webpage identified by an event URL in accordance with an illustrative embodiment.

FIG. 4 is a flow diagram of an example process for transmitting images to a webpage identified by an event URL, in accordance with an illustrative embodiment. The process 400 can be implemented on a computing device such as user device 106. In one embodiment, the process 400 is encoded on a computer-readable medium that contains instructions that, when executed by a computing device, cause the computing device to perform operations of the process 400.

The process 400 includes establishing (block 402) a connection to an NFC enabled event check-in point located at the event. The NFC enabled event check-in point can be encoded with event identification information for the event which includes an event URL. The event URL may be associated with an online system such as the online social networking system 110, the online photo sharing system 112, or another online system that enables users to share digital images with others.

At block 404, the event identification information including the event URL is received by an NFC enabled photo taking device from the NFC enabled event check-in point. The NFC enabled photo taking device is a user device 106. One or more digital images captured at the event are received (block 406). For example, the digital images can be captured using an electronic camera embedded in the NFC enabled photo taking device. The captured digital images are transmitted (block 408) to a computing system for further processing. The computing system can include any system that enables users to upload and view digital images. At block 410, an aggregation of digital images taken by at least a plurality of NFC enabled photo taking devices that were present at the event are received. The aggregation of digital images may be displayed on a user interface to the user and include one or more photo albums associated with the event.

Figure 5:
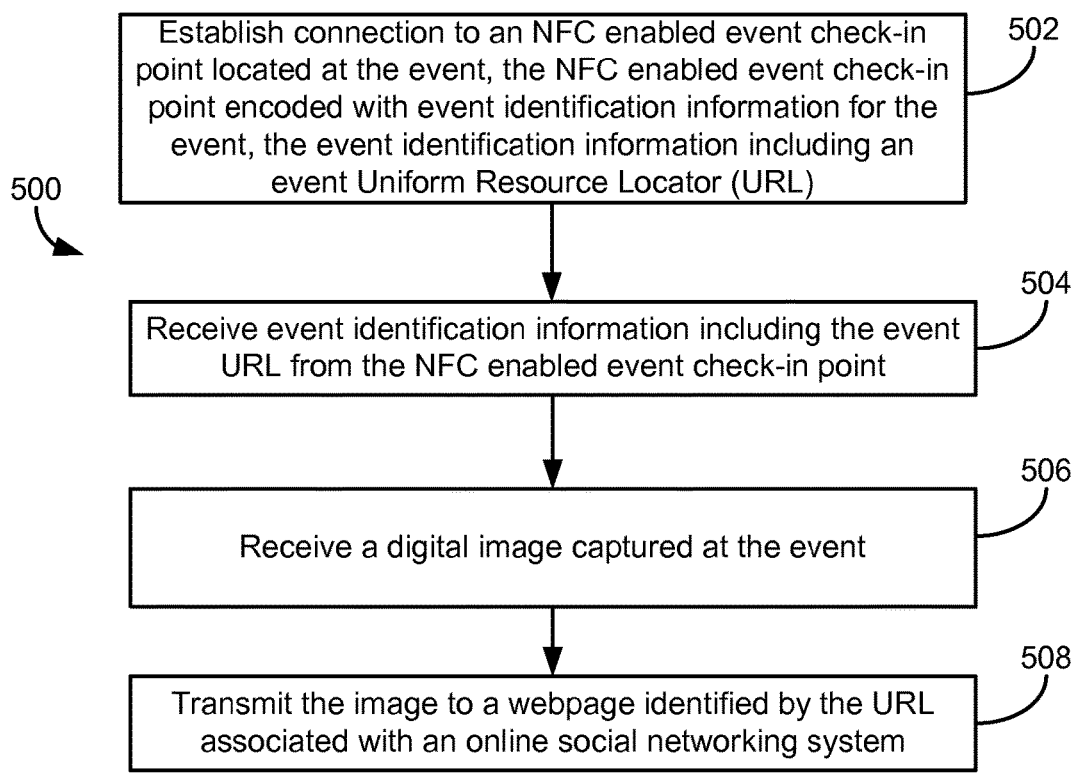
FIG. 5 is a flow diagram of an example for transmitting images to a webpage with an event URL encoded in an NFC enabled event check-in point in accordance with an illustrative embodiment.

FIG. 5 is a flow diagram of a process 500 for transmitting images to a webpage with an event URL encoded in an NFC enabled event check-in point in accordance with an illustrative embodiment. The process 500 can be implemented on a computing device. In one embodiment, the process 500 is encoded on a computer-readable medium that contains instructions that, when executed by a computing device, cause the computing device to perform operations of the process 500.

The process 500 includes establishing (block 502) a connection to an NFC enabled event check-in point located at the event. The NFC enabled event check-in point can be encoded with event identification information for the event which includes an event URL. The event URL may be associated with an online system such as the online social networking system 110, the online photo sharing system 112, or another online system that enables users to share digital images with others.

At block 504, the event identification information including the event URL is received from the NFC enabled event check-in point. A digital image captured at the event is received (block 506), and transmitted (block 508) to a webpage identified by the URL associated with an online social networking system (e.g., the online social network system 110). The digital image can be captured using an electronic camera embedded in an NFC enabled photo taking device (e.g., user device 106). The user can view digital images uploaded by multiple user who attended the event using the webpage identified by the URL or another webpage associated with the online social networking system.

Figure 6:
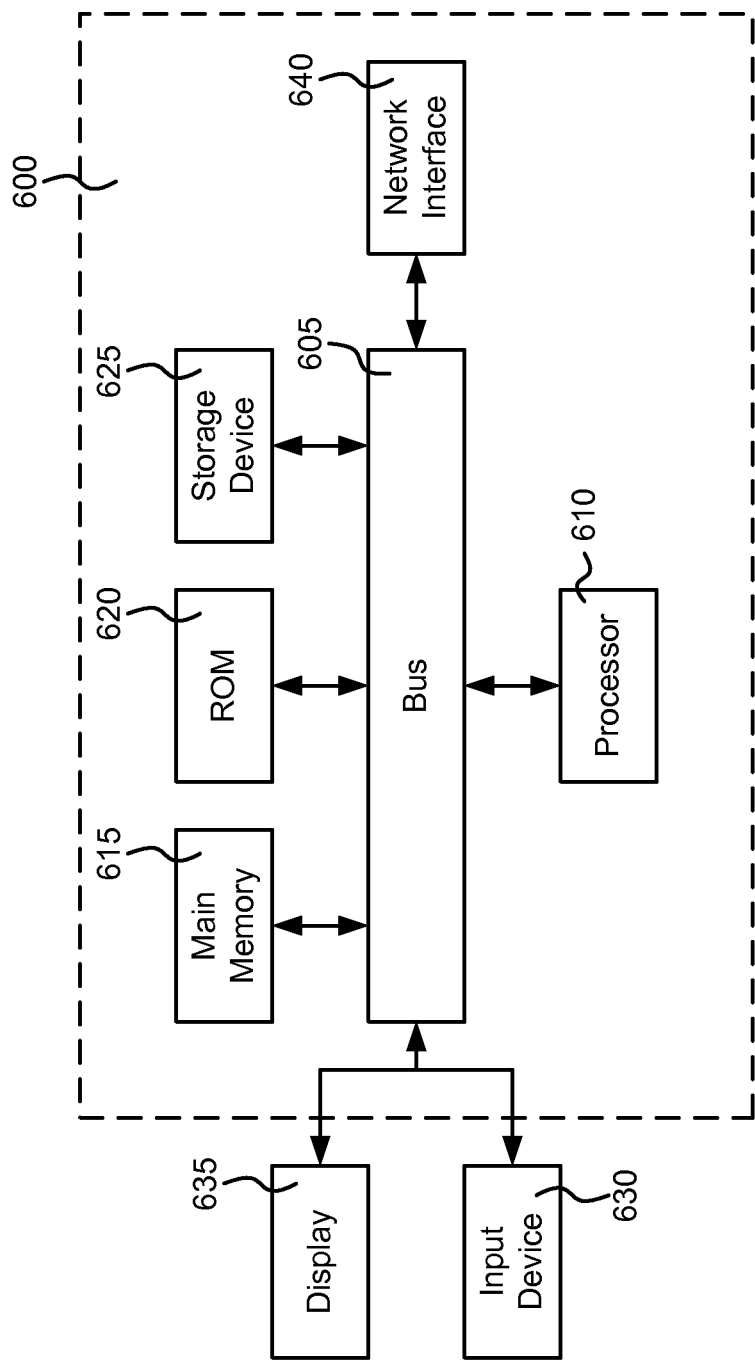
FIG. 6 is a block diagram of a computer system in accordance with an illustrative embodiment.

FIG. 6 is a block diagram of a computer system in accordance with an illustrative implementation. The computer system or computing device 600 can be used to implement the user devices 106, the online search engine 108, the online social networking system 110, the NFC enabled event check-in points 114, and/or the online photo sharing system 112, etc. The computing system 600 includes a bus 605 or other communication component for communicating information and a processor 610 or processing circuit coupled to the bus 605 for processing information. The computing system 600 can also include one or more processors 610 or processing circuits coupled to the bus 605 for processing information. The computing system 600 also includes main memory 615, such as a random access memory (RAM) or other dynamic storage device, coupled to the bus 605 for storing information, and instructions to be executed by the processor 410. Main memory 615 can also be used for storing position information, temporary variables, or other intermediate information during execution of instructions by the processor 610. The computing system 600 may further include a read only memory (ROM) 610 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information and command selections to the processor 610. In another implementation, the input device 630 has a touch screen display 635. The input device 630 can include a cursor control, such as a mouse, a trackball, or cursor direction keys, for communicating direction information and command selections to the processor 610 and for controlling cursor movement on the display 635.

According to various implementations, the processes described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to effect illustrative implementations. Thus, implementations are not limited to any specific combination of hardware circuitry and software.

Although an example computing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing circuit" encompasses all kinds of apparatus, devices, and machines for processing data, including by way of example a programmable processor, a computer, a system on a chip, or multiple ones, a portion of a programmed processor, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method to share digital media of an event, the method comprising:
    establishing an Near Field Communication (NFC) check-in connection by a computing device to a first check-in point of a plurality of check-in points, each check-in point being located at a different physical location at a venue of the event, by sending a connection request to the first check-in point, wherein the first check-in point includes a chip or a tag encoded with event data;
    receiving at the computing device by the NFC check-in connection of the computing device to the first check-in point, the event data from the encoded chip or tag of the first check-in point, wherein the event data includes information associated with a digital media sharing system for the event;
    accessing with use of the event data, over a network, a plurality of digital media items from the digital media sharing system captured at the event by a plurality of capture devices and transmitted to the digital media sharing system by respective other NFC check-in connections of the plurality of capture devices at the event with other check-in points of the plurality of check-in points, wherein the event data includes information associated with a respective other check-in point that received the respective digital media item;
    sorting the plurality of digital media items based on the information associated with the respective other check-in point that received the respective digital media item; and
    displaying on an electronic display, one or more sorted digital media items of the plurality of digital media items.

2. The computer-implemented method of claim 1, further comprising enabling other users in a social network of a user of the computing device to view the one or more digital media items.

3. The computer-implemented method of claim 1, wherein the connection request includes identifying information for the computing device or a user of the computing device and receiving the event data is based on a permission associated with the identifying information.

4. The computer-implemented method of claim 1, wherein the event data includes a barcode encoded with information identifying a webpage.

5. The computer-implemented method of claim 1, wherein accessing the plurality of digital media items includes sending a search request to an online search engine.

6. The computer-implemented method of claim 1, wherein the plurality of digital media items are included in a photo album and the method further comprises enabling at least one of the plurality of digital media to be added to the photo album.

7. The computer-implemented method of claim 1, further comprising automatically transmitting by the computing device on an intermittent basis, at least one of the plurality of digital media to the digital media sharing system.

8. The computer-implemented method of claim 1, wherein the information associated with the digital media sharing system includes a Uniform Resource Locator (URL) for a webpage associated with the event.

9. A computing system comprising:
    one or more processors;
    a user interface; and
    logic encoded in one or more tangible media for execution by the one or more processors and when executed operable to perform operations comprising:
        establishing an Near Field Communication (NFC) check-in connection to a first check-in point located at an event by sending a connection request to the first check-in point, wherein the first check-in point includes a chip or a tag encoded with event data;
        receiving, by the NFC check-in connection to the first check-in point, the event data from the encoded chip or tag of the check-in point, wherein the event data includes destination information associated with a collection of digital media items of a digital media sharing system for the event;
        accessing with use of the event data, over a network, a plurality of digital media items of the collection of digital media items from the digital media sharing system captured at the event by a plurality of capture devices and transmitted to the digital media sharing system by respective other NFC check-in connections of the plurality of capture devices at the event with other check-in points of the plurality of check-in points, wherein the event data includes information associated with a respective other check-in point that received the respective digital media item;
        sorting the plurality of digital media items based on the information associated with the respective other check-in point that received the respective digital media item; and
        displaying on the user interface of the computing system, one or more sorted digital media items of the plurality of digital media items.

10. The computing system of claim 9, wherein the operations further comprise enabling other users in a social network of a user of the computing system to view one or more of the plurality of digital media items.

11. The computing system of claim 9, wherein the connection request includes identifying information for the computing system or a user of the computing system and receiving the event data is based on a permission associated with the identifying information.

12. The computing system of claim 9, wherein the event data includes a barcode encoded with information identifying a webpage.

13. The computing system of claim 9, wherein accessing the plurality of digital media items includes sending a search request to an online search engine.

14. The computing system of claim 9, further comprise enabling at least one of the plurality of digital media items to be added to the collection of digital media items.

15. The computing system of claim 9, wherein the operations further comprise automatically transmitting by the computing system on an intermittent basis, at least one of the one or more digital media to the digital media sharing system.

16. The computing system of claim 9, wherein the destination information associated with the collection of digital media items includes a Uniform Resource Locator (URL) for a webpage associated with the event.

17. A non-transitory computer readable medium encoded with a computer program comprising instructions that, when executed by data processing apparatus, cause the data processing apparatus to perform operations comprising:
   establishing an Near Field Communication (NFC) check-in connection by a computing device to a first check-in point located at an event by sending a connection request to the first check-in point, wherein the first check-in point includes a chip or a tag encoded with event data;
   receiving at the computing device by the NFC check-in connection of the computing device to the first check-in point, the event data from the encoded chip or tag of the check-in point, wherein the event data includes information associated a digital media sharing system for the event;
   accessing with the event data, over a network, a plurality of digital media items from the digital media sharing system captured at the event by a plurality of capture devices and transmitted to the digital media sharing system by respective other NFC check-in connections of the plurality of capture devices at the event with other check-in points of the plurality of check-in points, wherein the event data includes information associated with a respective other check-in point that received the respective digital media item;
   sorting the plurality of digital media items based on the information associated with the respective other check-in point that received the respective digital media item; and
   displaying on an electronic display, one or more sorted digital media items of the plurality of digital media items.

18. The computer readable medium of claim 17, wherein the connection request includes identifying information for the computing device or a user of the computing device and receiving the event data is based on a permission associated with the identifying information.

19. The computer readable medium of claim 17, wherein the plurality of digital media items are included in a photo album and the operations further comprise enabling at least one of the plurality of digital media items to be added to the photo album.

20. The computer readable medium of claim 17, wherein the operations further comprise, automatically transmitting by the computing device on an intermittent basis, at least one of the plurality of digital media items to the digital media sharing system.

\* \* \* \* \*